(12) United States Patent
Svestka et al.

(10) Patent No.: US 6,859,883 B2
(45) Date of Patent: Feb. 22, 2005

(54) PARALLEL DATA COMMUNICATION CONSUMING LOW POWER

(75) Inventors: Ivan Svestka, North Riverside, IL (US); DC Sessions, Phoenix, AZ (US); David R. Evoy, Tempe, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 571 days.

(21) Appl. No.: 09/871,160

(22) Filed: May 31, 2001

(65) Prior Publication Data

US 2002/0184544 A1 Dec. 5, 2002

(51) Int. Cl.⁷ .............................. G06F 1/32; G06F 13/14; H04J 15/00
(52) U.S. Cl. ..................... 713/320; 370/464; 710/305
(58) Field of Search .................. 713/320; 370/464; 710/305, 71; 714/759

(56) References Cited

U.S. PATENT DOCUMENTS

| | | | |
|---|---|---|---|
| 5,208,562 A | | 5/1993 | Schirm, IV |
| 5,239,559 A | * | 8/1993 | Brach et al. ............... 375/257 |
| 5,553,250 A | | 9/1996 | Miyagawa et al. |
| 5,686,872 A | * | 11/1997 | Fried et al. ............... 333/22 R |
| 6,140,841 A | * | 10/2000 | Suh ............................... 326/60 |
| 6,211,698 B1 | | 4/2001 | Suh |
| 6,232,895 B1 | * | 5/2001 | Djupsjobacka et al. ..... 341/100 |

FOREIGN PATENT DOCUMENTS

| | | | | |
|---|---|---|---|---|
| JP | 10268992 A | * | 10/1998 | ............. G06F/3/00 |
| JP | 10289042 A | * | 10/1998 | ............. G06F/3/00 |

OTHER PUBLICATIONS

Canright, Practical Design for Controlled Impedence, 1991, IEEE, pp. 370–377.*

* cited by examiner

*Primary Examiner*—Dennis M. Butler
*Assistant Examiner*—Suresh K Suryawanshi
(74) *Attorney, Agent, or Firm*—Peter Zawilski

(57) ABSTRACT

In one example embodiment involving a high-speed parallel-data communication from a first module to a second module, a termination circuit is adapted to reduce power consumption at the second module. The termination circuit includes resistive circuits respectively coupled to a plurality of parallel data-carrying lines that form the data bus. The other ends of the resistive circuits are interconnected to provide a reference voltage using the data on the parallel data-carrying lines. Consistent with one embodiment of the present invention, the communication approach uses data sets encoded so that each data set includes the same number of ones and zeroes; in this manner the reference voltage is always at midpoint and useful in providing termination to the data-carrying lines at all times.

20 Claims, 2 Drawing Sheets

PARALLEL DATA COMMUNICATION CONSUMING LOW POWER

RELATED PATENT DOCUMENTS

The present invention is related to and fully incorporates the subject matter disclosed in concurrently-filed U.S. patent applications Ser. No. 09/871,197, entitled "Parallel Communication Based On Balanced Data-Bit Encoding" (VLSI.295PA), Ser. No. 09/871,159, entitled "Parallel Data Communication Having Skew Intolerant Data Groups" (VLSI.300PA), and Ser. No. 09/871,117, entitled "Parallel Data Communication Having Multiple Sync Codes" (VLSI.312PA).

FIELD OF THE INVENTION

The present invention is directed generally to data communication. More particularly, the present invention relates to methods and arrangements for reducing power consumed at the terminating end of a parallel data communication circuit.

BACKGROUND OF THE INVENTION

The electronics industry continues to strive for high-powered, high-functioning circuits. Significant achievements in this regard have been realized through the fabrication of very large-scale integration of circuits on small areas of silicon wafer. These complex circuits are often designed as functionally-defined modules that operate on a set of data and then pass that data on for further processing. This communication from such functionally-defined modules can be passed in small or large amounts of data between individual discrete circuits, between integrated circuits within the same chip, and between remotely-located circuits coupled to or within various parts of a system or subsystem. Regardless of the configuration, the communication typically requires closely-controlled interfaces to insure that data integrity is maintained and that circuit designs are sensitive to practicable limitations in terms of implementation space and available operating power.

The demand for high-powered, high-functioning semiconductor devices has lead to an ever-increasing demand for accelerating the speed at which data is passed between the circuit blocks. Many of these high-speed communication applications can be implemented using parallel data transmission in which multiple data bits are simultaneously sent across parallel communication paths. Such "parallel bussing" is a well-accepted approach for achieving data transfers at high data rates. For a given data-transmission rate (sometimes established by a clock passed along with the data), the bandwidth, measured in bits-per-second, is equivalent to the data transmission rate times the number of data signals comprising the parallel data interconnect.

A typical system might include a number of modules that interface to and communicate over a parallel data communication line (sometimes referred to as a data channel); for example, in the form of a cable, a backplane circuit, a bus structure internal to a chip, other interconnect, or any combination of such communication media. A sending module would transmit data over the bus synchronously with a clock on the sending module. In this manner, the transitions over the parallel signal lines leave the sending module in a synchronous relationship with each other and/or to the clock on the sending module. At the other end of the parallel data interconnect, the data is received along with a clock signal; the receive clock is typically derived from or is synchronous with the clock on the sending module. The rate at which the data is passed over the parallel signal lines is sometimes referred to as the (parallel) "bus rate."

In such systems, it is beneficial to ensure that the received signals (and where applicable, the receive clock) have a specific phase relationship to the transmit clock, to provide proper data recovery. There is often an anticipated amount of time "skew" between the transmitted data signals themselves and between the data signals and the receive clock at the destination. There are many sources of skew including, for example, transmission delays introduced by the capacitive and inductive loading of the signal lines of the parallel interconnect, variations in the I/O (input/output) driver source, intersymbol interference and variations in the transmission lines' impedance and length. Regardless of which phenomena cause the skew, achieving communication with proper data recovery, for many applications, should take this issue into account.

For parallel interconnects serving higher-speed applications, in connection herewith it has been discovered that skew is "pattern dependent" and that the severity of this issue can be mitigated and, in many instances, largely overcome. As described in the above-referenced patent document entitled "Parallel Communication Based On Balanced Data-Bit Encoding" (VLSI.295PA), this pattern dependency results from the imperfect current sources shared between the data bits in the parallel bus. The shared current sources induce skew at the driver, which directly reduces margin at the receiver, which in turn can cause data transmission errors.

Many of these high-speed parallel communication applications require a voltage-biased termination at the receiving end. The voltage-biased termination minimizes discontinuities at communication-media junctions as can occur with most high-frequency signaling implementations, and also provides an appropriate signal level when the parallel communication bus is idle. Because these goals are directed to preserving signal integrity for the overall communication process, many industry recommendations include specific requirements for the type and location of the termination.

These bus terminations are typically implemented to draw power. For instance, the SST_2 signaling described in EIA/JEDEC Standard STUB Series Terminated Logic For 2.5 Volts (SSTL_2), EIA/JESD8-9 suggests a biased termination that would be typically implemented using a resistor for each bus line, with one resistor end connected to the bus line and the other end connected to a voltage-reference node. Unfortunately, using the voltage-reference node to bias the bus line constantly consumes power and for an application with a parallel data bus involving a large number of bus lines, the magnitude of power consumed increases accordingly.

This power consumption concern can be mitigated to a degree by switching off the termination power when the bus is in an idle state. This approach, however, can adversely effect throughput and thereby degrade bus performance. In addition, switching off the termination power in such a manner requires a switching control circuit, which also consumes power.

For high-speed data-transmission applications, there are various other disadvantages. For example, many interfaces are designed without sufficient consideration of the space and material costs in the number of power nodes and conductors required for passing such high-speed data signals over the parallel busses. By reducing the power consumption for such high-speed applications, the number of power nodes and conductor pins can be reduced; in a power-critical application, such reductions can be significant. Moreover, reducing the current flow in high-speed parallel data communication applications can substantially reduce electromagnetic interference ("EMI") which, in turn, can reduce the likelihood of signal recovery problems at the receiving module and thereby reduce the need for expensive and often burdensome EMI shielding.

Accordingly, improving data communication over parallel busses permits more practicable and higher-speed parallel bussing applications which, in turn, can directly lead to higher-powered, higher-functioning circuits that preserve data integrity and are sensitive to needs for reducing implementation space and power consumption.

SUMMARY OF THE INVENTION

Various aspects of the present invention are directed to data transfer over parallel-communication line circuits in a manner that addresses and overcomes the above-mentioned issues and can be used in conjunction with the embodiments disclosed in the above-mentioned patent documents. In one application involving a high-speed data transfer over a parallel data circuit, an example embodiment of the present invention significantly decreases power consumed for the parallel data transmission while maintaining data integrity. In certain embodiments, the present invention reduces power consumption at the receiving module and thereby reduces EMI and reduces the number of power pins (or, more generally, power nodes) required for the parallel data communication. Furthermore, although not required, the need for a power-termination switching circuit is avoided and certain implementations of the invention improve communication efficiency and integrity.

One embodiment of the present invention is directed to a parallel data communication arrangement in which digital data is transferred in parallel from a first module to a second module over a communication channel including a plurality of parallel data-carrying lines. A termination circuit is located at the second module, and the termination of the parallel data-carrying lines at the second module is provided by resistive coupling to each of the parallel data-carrying lines and therefrom, providing a reference voltage using the data on the parallel data-carrying lines. In one application, the data is sent over the parallel data-carrying lines with the data encoded to include approximately the same number of logical ones and logical zeroes, so that the reference voltage is substantially biased at a stable voltage level by the data on the parallel data-carrying lines.

In a more particular embodiment, each of the parallel data-carrying lines is connected to one of two inputs of a differential receiver at the second module. The other input of the differential receiver is maintained at a reference voltage set midway between the respective voltage levels defining the logical ones and logical zeroes. Also according to the present invention, this reference voltage can be defined at a very precise stable level by using the parallel data-carrying lines to define the reference voltage and ensuring that the number of logical ones and logical zeroes is always the same.

Yet another particular example embodiment involves a parallel data communication arrangement in which digital data is transferred in parallel over a communication channel to a receiving module having termination at each end of the parallel bus' data lines. The termination circuit reduces power consumption at the receiving module by using resistive circuits respectively coupled to selected parallel data-carrying lines. The other ends of the resistive circuits are interconnected to provide a reference voltage using the data on the parallel data-carrying lines.

Consistent with one more particular embodiment of the present invention, the communication approach uses data sets encoded so that each data set includes the same number of ones and zeroes; in this manner the reference voltage is always at midpoint and useful in providing definition to the data-carrying lines without requiring a power termination circuit.

Other example embodiments of the present invention are respectively directed to the encoding, decoding and system-processing aspects of such interfaces.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
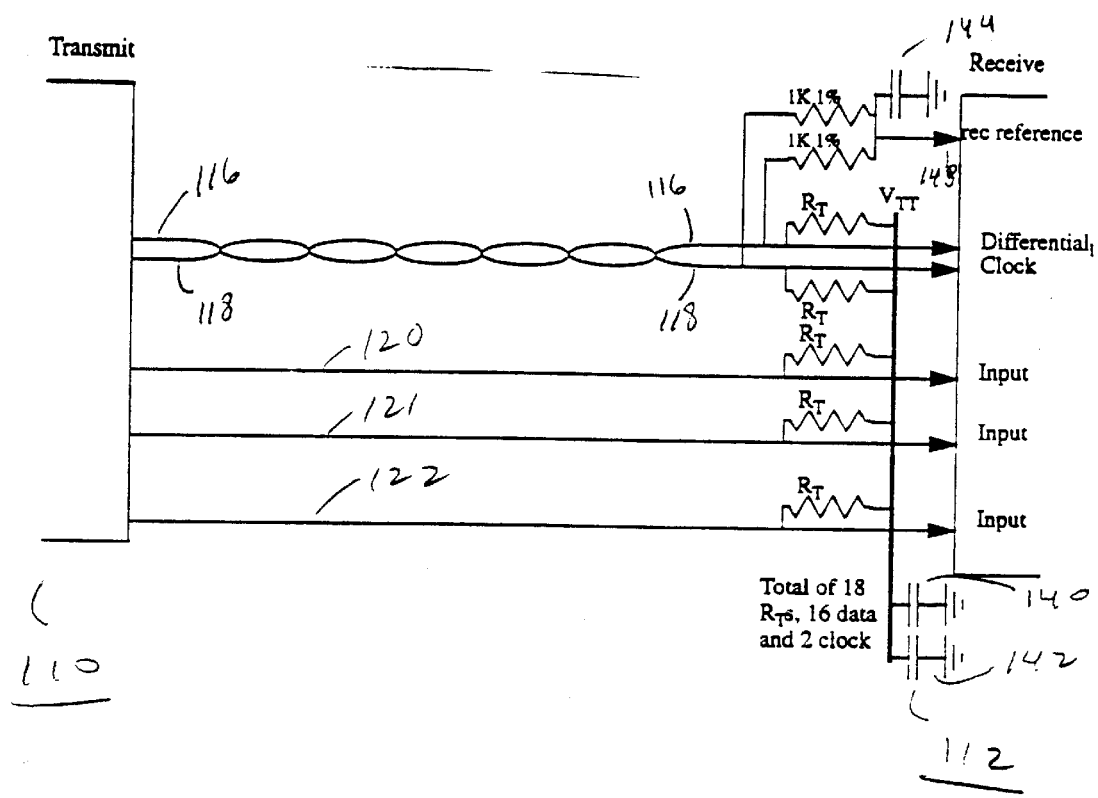
FIG. 1 is a diagram of a parallel data communication arrangement in which digital data is transferred in parallel from a first module to a second module over a communication channel including a plurality of parallel data-carrying lines terminating at the second module, according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF VARIOUS ILLUSTRATED EXAMPLE EMBODIMENTS

The present invention is believed to be generally applicable to methods and arrangements for transferring data between two modules (functional blocks) intercoupled by a parallel data communication path. The invention has been found to be particularly advantageous for high-speed data transfer applications requiring or benefiting from reductions in circuit-implementation space and power consumption. Examples of such applications include, among others, SSTL (stub series transceiver/terminated logic), RSL (Rambus Signaling Logic) interfaces, closely-connected applications such as where the parallel data communication path intercouples the two modules on a single-chip, off-board high-speed communication between chips typically situated immediately adjacent each other on the same printed circuit board such as on a reference-chip development platform of the type disclosed in U.S. patent application Ser. No. 09/215, 942, filed on Dec. 18, 1998, now U.S. Pat. No. 6,347,395. While the present invention is not necessarily limited to such applications, an appreciation of various aspects of the invention is best gained through a discussion of examples in such an environment.

According to one example embodiment of the present invention, a parallel data communication arrangement passes digital data on a parallel data bus between a pair of circuit modules. The data is coded so that the number of ones and the number of zeroes in each transmitted data set is at least approximately (i.e., almost or exactly) the same. A termination circuit, located at the receiving module, is used to resistively couple each of the bus' data lines to a common node. Because the number of ones and the number of zeroes in each transmitted data set is about the same, the resistively-coupled data lines can be used to maintain the common node at a reference voltage. This reference voltage can then be used to provide a bias for the bus lines even when the bus is not active.

In one specific application of the above example embodiment, the encoding is implemented so that the number of ones and the number of zeroes in each transmitted data set is exactly the same for all data transmitted over the parallel bus. Examples of such balanced coding are provided in the above-mentioned patent document entitled, "Parallel Communication Based On Balanced Data-Bit Encoding" (VLSI.295PA). This approach assures that the reference voltage, as defined at the common node, does not fluctuate. This stable voltage can be achieved by using the parallel data-carrying lines to define the reference voltage and ensuring that the number of logical ones and logical zeroes is always the same. For example, the common node can be resistively coupled to each of the parallel data-carrying lines. In accordance with the present invention, this approach is highly advantageous for applications in which the logic sign of the data received via the parallel data-carrying lines is sensed using a differential receiver having its other input maintained at the reference voltage set midway between the respective voltage levels defining the logical ones and logical zeroes.

In another specific application, the encoding is implemented so that he number of ones and the number of zeroes in each transmitted data set is at least approximately the same for all data transmitted over the parallel bus. Examples of such coding are readily obtained by varying the balanced coding approaches to include additional or alternative codes that slightly imbalance the ratio of zeroes to ones. This approach is useful, for example, where more codes are needed or where the number of data lines is odd. In approximating a 1:1 ratio, in addition to considering the issue of skew as discussed in the patent document entitled, "Parallel Communication Based On Balanced Data-Bit Encoding" (VLSI.295PA), the approximation should assure that the reference voltage, as defined by the resistively-coupled data lines at the common node, does not fluctuate to such a degree that the signal line is not considered appropriately terminated.

FIG. 1 illustrates another example embodiment of the present invention in which a clock is used to define the rate at which the data is synchronously passed between a transmit module 110 and a receive module 112. The parallel data communication arrangement of FIG. 1 illustrates data being passed in only one direction but the skilled artisan will appreciate that reciprocal communication can also be provided with each of the modules 110 and 112 being part of a respective communication node that includes the reciprocal set of transmit and receive modules. Although not required for all clocked applications, the embodiment shown in FIG. 1 is a differential clock, using two lines 116 and 118 to pass the differential clock signal for synchronous communication of data passed on the associated data-carrying bit lines (120, 121, 122, etc.) of the parallel bus. In this context, the communication channel between the transmit module 110 and the receive module 112 includes a total of N lines, where N equals two more than the number of associated data-carrying bit lines.

For each of the bus lines, including the two differential clock lines 116 and 118 and the associated data-carrying bit lines beginning at line 120, there is a termination resistance denoted $R_T$. For a chip-chip module-communicating application each $R_T$ should equal the board impedance. For example, using the NAPA (Nexperia Advanced Prototyping Architecture) recommendation, $R_T$ should be selected at 50 Ohms and with 1% precision. For a module-communicating application implemented on the same chip, the resistance value of $R_T$ is set equal to the calculated line impedance. For each resistance $R_T$, the side of the resistance opposite the bus line is the common node denoted $V_T$ in FIG. 1.

The capacitors 140, 142, and 144 in FIG. 1 are conventional for such termination. When using the NAPA recommendation with 16 data lines and 2 differential clock lines, the capacitors 140 and 142 are used between the common node and ground for the 18 bus lines sharing a common node and the capacitor 144 is used between the generated reference voltage (at node 148) and ground, with each capacitor being equal to 0.1 Farads.

In a more specific implementation of the chip-chip module-communicating application, such as one used with SSTL-2 I/O (EIA/JESD8-9) specifications, each termination resistor is located within 0.5 inch before the ball on the receiving package and not greater than 0.5 inch from the connecting data line. Alternatively, each termination resistor is located within 2 inches after the ball on the receiving package and not greater than 0.5 inch from the connecting data line with the common node effectively defining the end of each data line.

Various approaches to the arrangement shown in FIG. 1 are advantageous in terms of power savings. In connection with the use of the above-discussed differential receiver at the second module, with the reference voltage at the common node always being set at the midpoint level, none of the data-carrying bus lines require a termination power supply. It will be appreciated that such a midpoint level is self adjusted by the aggregate voltage levels of the data on the data-carrying bus lines.

There are other power-saving approaches that can be used independently or in combination with the above approach. In another application and useful for bus inactivity (or "idle") conditions, power savings are realized by driving all the data-carrying bus lines to the logic zero voltage level; thereby driving out illegal codes and setting all the line terminations to zero volts. Another approach uses an unbalanced code (e.g., one line high and the other low) to force the reference voltage at the common node to a voltage level that corresponds more to many coded data values than to any particular one.

Figure 2:
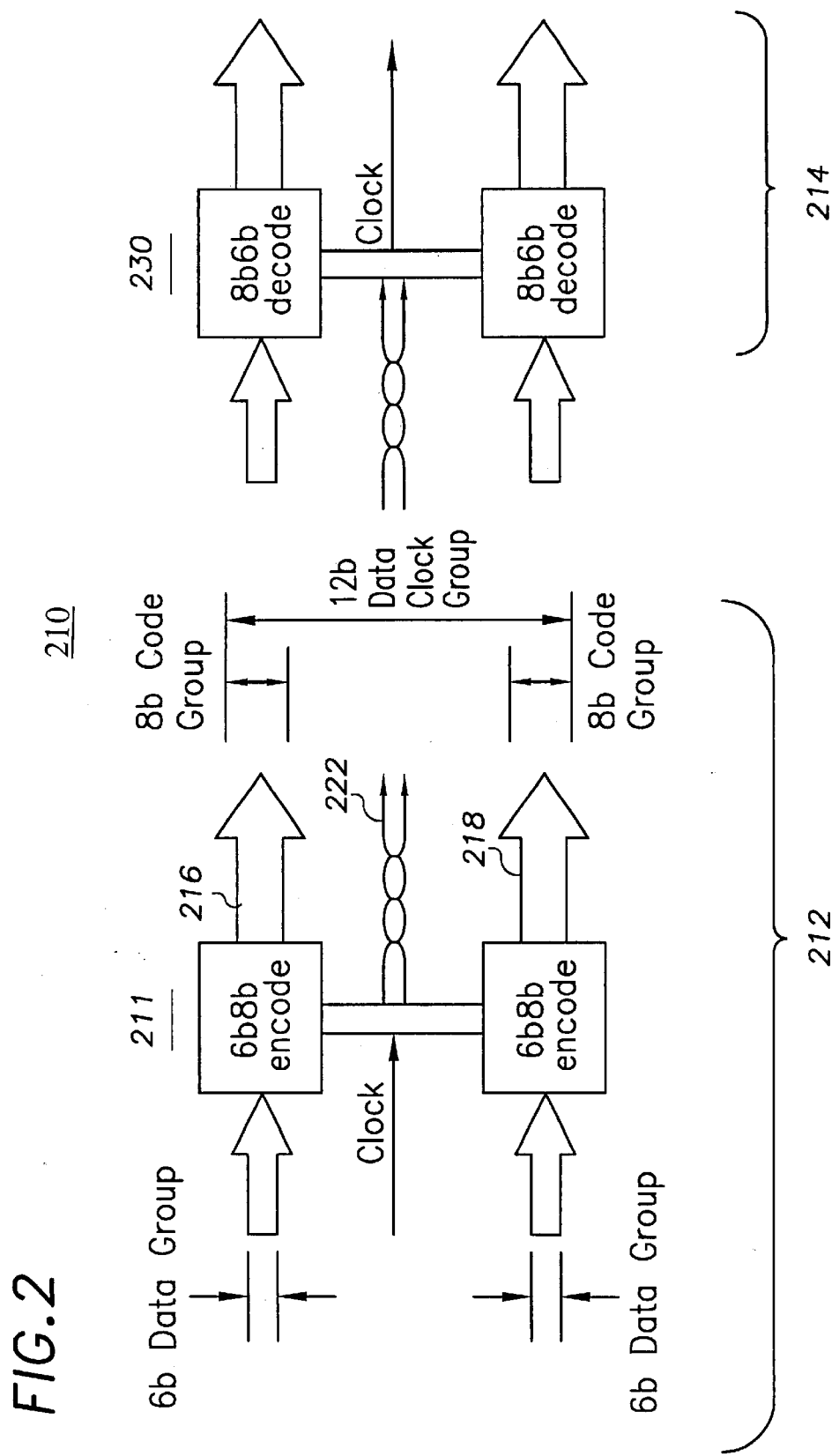
FIG. 2 is a diagram of another parallel data communication line arrangement, according to an example implementation of the present invention, that can incorporate the arrangement of FIG. 1.

FIG. 2 illustrates a parallel-data communication line arrangement 210, according to another example implementation of the present invention. Related to the previous example embodiments, the arrangement passes 210 uses a data-value encoding approach in which data values are encoded by circuit 211 and then passed, from a sending module 212 to a receiving module 214, using parallel data lines 216 and 218 along with clock lines 222. The clock lines 222 provide the data-communication rate and synchronization between sending and receiving modules 212 and 214. At the receiving module 214, a processor or other decode circuit 230 uses a reciprocal algorithm, lookup table or equivalent circuit to decode the data value back to its 6-bit data value.

The arrangement 210 is directed to an application involving 6-bit code ("6b") groups, 8-bit code ("8 b") groups, and 12-bit data clock (12b DC) groups. The 12b DC groups efficiently encode communications of data or commands of 12 signals. In some cases, it may be advantageous to use smaller groups. A 12b DC group includes a differential clock pair and two 6b8 b encodes, for a total of 18 pins between the sending module 212 and the receiving module 214. One half of the 12b DC group includes one 6b8b encoder and a differential clock pair, for a total of 10 pins. Un-encoded differential pairs can also be used to transport signals. These differential pairs can share the clock signal used with one half of a 12b DC group, or the differential pairs can have their own clock pair.

A number of different 6b8b encoding approaches can be used, examples of which are provided in the above-referenced, concurrently-filed patent document (VLSI.295PA). According to the present invention, each of the bus lines is terminated as shown in FIG. 1.

Accordingly, various embodiments have been described as example implementations of the present invention, and these embodiments include one of more of the following advantages: the common-node voltage $V_T$ does not require a power supply; the common-node voltage $V_T$ is naturally centered between the high and low voltage outputs of the transmit module; power consumption is minimized when the outputs are disconnected or inoperative; and a very low power idle state is provided when all outputs are driven to zero.

The present invention should not be considered limited to the particular examples described above. Various modifications, equivalent processes, as well as numerous structures to which the present invention may be applicable fall within the scope of the present invention such as multi-chip or single-chip arrangements that can be implemented using a similarly constructed one-way or two-way interface for communication between the chip-set arrangements. Further, the precision of the termination can vary and is dependent on the specified design; for example, in an 8b–10b encoded bus application (8b–10b being common in the serial Ethernet arrangements), some codes are not balanced. Such variations may be considered as part of the claimed invention, as fairly set forth in the appended claims.

What is claimed is:

1. For use in a parallel data communication arrangement in which digital data is transferred in parallel from a first module to a second module over a communication channel including a plurality of parallel data-carrying lines, a termination circuit located at the second module, the termination circuit comprising:
    a plurality of resistive circuits respectively coupled to different ones of the plurality of parallel data-carrying lines, the plurality of resistive circuits adapted to provide a reference voltage using the data on the parallel data-carrying line.

2. A parallel data communication arrangement in which digital data is transferred in parallel from a first module to a second module, the arrangement comprising:
    a communication channel including a plurality of parallel data-carrying lines, the communication channel adapted to transfer the digital data between the first and second modules; and
    at the second module, a termination circuit including a plurality of resistive circuits respectively coupled to different ones of the plurality of parallel data-carrying lines, the plurality of resistive circuits adapted to provide a reference voltage using the data on the parallel data-carrying lines.

3. The parallel data communication arrangement of claim 2, wherein the reference voltage provides a bias voltage to each of the different ones of the plurality of parallel data-carrying lines.

4. The parallel data communication arrangement of claim 3, wherein the bias voltage is defined by a code system used to represent the data as encoded data on the data-carrying lines.

5. The parallel data communication arrangement of claim 4, further including an encoding circuit at the first module, the encoding circuit adapted to convert data values to the encoded data.

6. The parallel data communication arrangement of claim 5, wherein the encoding circuit at the first module is adapted to the encode data values to assure at lest an approximate balance in the respective quantities of logical ones and logical zeroes.

7. The parallel data communication arrangement of claim 6, wherein the encoded data includes an exact balance in the respective quantities of logical ones a logical zeroes.

8. The parallel data communication arrangement of claim 2, further including an encoding circuit at the first module and a decoding circuit at the second module.

9. The parallel data communication arrangement of claim 8, wherein the encoding circuit at the first module is adapted to encode data values into corresponding encoded data, the encoded data including an approximate balance in the respective quantities of logical ones and logical zeroes, and wherein the decoding circuit at the second module is adapted to decode the encoded data into the corresponding data values.

10. A parallel data communication arrangement, the arrangement comprising:
    a first module including an encoding circuit adapted to encode data values into corresponding encoded data and a set of data drivers;
    a second module including a set of data receivers, a decoding circuit adapted to decode the encoded data into the corresponding data values, and a termination circuit;
    a communication channel including a plurality of parallel data-carrying lines, the communication channel adapted to transfer the encoded data from the set of data drivers at the first module to the set of data receivers at the second module; and
    at the second module, a termination circuit including a plurality of resistive circuits respectively coupled to different ones of the plurality of parallel data-carrying lines, the plurality of resistive circuits adapted to provide a biasing reference voltage using the data on the parallel data-carrying lines.

11. The parallel data communication arrangement of claim 10, wherein the communication channel includes a clock-signal communication path carrying at least one clock signal synchronized to a plurality of the encoded data.

12. The parallel data communication arrangement of claim 11, wherein the clock-signal communication path carries a pair of clock signals cooperatively generated to provide a differential clock signal.

13. The parallel data communication arrangement of claim 11, wherein the encoded data includes an exact balance in the respective quantities of logical ones and logical zeroes.

14. For use in a parallel data communication arrangement in which digital data is transferred in parallel from a first module to a second module over a communication channel including a plurality of parallel data-carrying lines, a termination circuit located at the second module, the termination circuit comprising:

first means for resistively coupling to one of the plurality of parallel data-carrying lines; and second means for resistively coupling to another of the plurality of parallel data-carrying lines, the first and second means coupled to one another for providing a reference voltage using the data on the parallel data-carrying lines.

15. The arrangement of claim 14, further including means for sending data over the parallel data-carrying lines with the data encoded to include approximately the same number of logical ones and logical zeroes, wherein the reference voltage is biased by the data on the parallel data-carrying lines.

16. A parallel data communication arrangement in which digital data is transferred in parallel from a first module to a second module, the arrangement comprising:

a communication channel including a plurality of parallel data-carrying lines, the communication channel adapted to transfer the digital data between the first and second modules; and at the second module, termination means including a plurality of resistive means respectively coupled to different ones of the plurality of parallel data-carrying lines, for providing a reference voltage using the data on the parallel data-carrying lines.

17. The arrangement of claim 16, further including means for sending data over the parallel data-carrying lines with the data encoded to include approximately the same number of logical ones and logical zeroes, wherein the reference voltage is biased by the data on the parallel data-carrying lines.

18. For use in a parallel data communication arrangement in which digital data is transferred in parallel from a first module to a second module over a communication channel including a plurality of parallel data-carrying lines, a termination circuit located at the second module, a method of terminating the parallel data-carrying lines, the method comprising:

resistively coupling to the plurality of parallel data-carrying lines and therefrom, providing a reference voltage using the data on the parallel data-carrying lines.

19. The method of claim 16, further including sending data over he parallel data-carrying lines with the data encoded to include approximately the same number of logical ones and logical zeroes, wherein the reference voltage is biased by the data on the parallel data-carrying lines.

20. The method of claim 18, further including sending data over he parallel data-carrying lines with the data encoded to include the same number of logical ones and logical zeroes, wherein the reference voltage is biased by the data on the parallel data-carrying lines.

* * * * *